United States Patent
Agrawal et al.

(10) Patent No.: US 11,882,495 B2
(45) Date of Patent: Jan. 23, 2024

(54) TECHNIQUES FOR MOBILITY FOR DUAL SUBSCRIBER DUAL ACTIVE USER EQUIPMENT

(71) Applicant: QUALCOMM Incorporated, San Diego, CA (US)

(72) Inventors: Mona Agrawal, San Diego, CA (US); Arvind Vardarajan Santhanam, San Diego, CA (US); Rishav Rej, San Diego, CA (US); Qingxin Chen, San Diego, CA (US); Reza Shahidi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/302,832

(22) Filed: May 13, 2021

(65) Prior Publication Data

US 2022/0369191 A1    Nov. 17, 2022

(51) Int. Cl.
*H04W 36/14*    (2009.01)
*H04W 8/18*    (2009.01)
*H04W 36/36*    (2009.01)

(52) U.S. Cl.
CPC ........... *H04W 36/14* (2013.01); *H04W 8/183* (2013.01); *H04W 36/36* (2013.01)

(58) Field of Classification Search
CPC .......................... H04W 36/0055; H04W 36/18
USPC ....................................... 455/4, 43
See application file for complete search history.

(56) References Cited

U.S. PATENT DOCUMENTS

| | | | | |
|---|---|---|---|---|
| 2005/0108347 A1* | 5/2005 | Lybeck | ................... | H04L 67/54 709/207 |
| 2013/0107859 A1* | 5/2013 | Shi | ........................ | H04W 36/18 370/331 |
| 2014/0038569 A1* | 2/2014 | Chin | ....................... | H04W 4/16 455/414.1 |
| 2015/0023230 A1 | 1/2015 | Hu et al. | | |
| 2016/0105808 A1* | 4/2016 | Song | ................... | H04W 52/288 455/422.1 |

(Continued)

FOREIGN PATENT DOCUMENTS

WO    2018053746 A1    3/2018

OTHER PUBLICATIONS

International Search Report and Written Opinion—PCT/US2022/071745—ISA/EPO—dated Aug. 12, 2022.

*Primary Examiner* — Charles N Appiah
*Assistant Examiner* — Frank E Donado
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish a first call associated with a first subscriber of the UE. The UE may establish a second call associated with a second subscriber of the UE, wherein the first subscriber and the second subscriber are active contemporaneously, and wherein the first call and the second call are associated with a first radio access technology (RAT). The UE may identify a mobility event that associated with an interruption to at least one of the first call and the second call, the mobility event involving switching the first subscriber to a second RAT. The UE may perform a mitigation action. Numerous other aspects are described.

32 Claims, 12 Drawing Sheets

(56) References Cited

U.S. PATENT DOCUMENTS

| | | |
|---|---|---|
| 2017/0280366 A1 | 9/2017 | Sahu et al. |
| 2017/0332222 A1 | 11/2017 | Raghunathan et al. |
| 2018/0249376 A1* | 8/2018 | Forssell ............ H04W 28/0846 |
| 2019/0230508 A1* | 7/2019 | Olsson .................. H04W 4/90 |
| 2020/0236595 A1 | 7/2020 | Cuevas Ramirez et al. |
| 2020/0296638 A1 | 9/2020 | Tsai et al. |
| 2021/0029773 A1 | 1/2021 | Majumder et al. |
| 2021/0282059 A1* | 9/2021 | Li ........................... H04M 1/57 |
| 2022/0191758 A1* | 6/2022 | Sridharan ............. H04W 76/30 |

\* cited by examiner

TECHNIQUES FOR MOBILITY FOR DUAL SUBSCRIBER DUAL ACTIVE USER EQUIPMENT

FIELD OF THE DISCLOSURE

Aspects of the present disclosure generally relate to wireless communication and to techniques and apparatuses for mobility for a dual subscriber identity module (SIM) dual active (DSDA) user equipment (UE).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a first call associated with a first subscriber of the UE; establishing a second call associated with a second subscriber of the UE, wherein the first subscriber and the second subscriber are active contemporaneously, and wherein the first call and the second call are associated with a first radio access technology (RAT); identifying a configuration that indicates a combination of calls that can be performed in association with multiple active calls for different subscribers for one or more RATs; identifying a mobility event associated with an interruption to at least one of the first call and the second call, the mobility event involving switching the first subscriber to a second RAT; and performing a mitigation action based at least in part on the configuration and the mobility event.

In some aspects, the first call is a voice call over the first RAT, and performing the mitigation action comprises: entering a dual subscriber dual standby configuration; and suspending the second call until the first call concludes.

In some aspects, the method includes continuing the first call on the second RAT.

In some aspects, the first call is a voice call and the second call is a data call.

In some aspects, the first call is a data call on the first RAT, and performing the mitigation action comprises: cancelling the mobility event; and continuing the first call and the second call on the first RAT.

In some aspects, the UE remains in the DSDA configuration after the mitigation action is performed.

In some aspects, the first call is a voice call and the mobility event is an Evolved Packet System fallback to the second RAT, and performing the mitigation action comprises: entering a dual subscriber dual standby configuration; and suspending the second call until the first call concludes.

In some aspects, the method includes performing the mobility event.

In some aspects, the first call is a mobile-originated or mobile-terminated voice call, and the second call is a voice call, and performing the mitigation action comprises: cancelling the mobility event; and continuing the second call.

In some aspects, the mobility event is an Evolved Packet System fallback to the second RAT.

In some aspects, the first call is an Enhanced 911 (E911) call and the mobility event is an Evolved Packet System fallback to the second RAT, and performing the mitigation action comprises: performing the mobility event; and disabling a protocol entity associated with the second call.

In some aspects, the first call is a mobile-originated or mobile-terminated voice call and the second call is associated with a gaming service, the mobility event is an Evolved Packet System fallback to the second RAT, and performing the mitigation action comprises: cancelling the mobility event; and continuing the second call.

In some aspects, the first subscriber is associated with a default data subscriber identity module (DDS) of the UE and the second subscriber is associated with a non-DDS of the UE.

In some aspects, the second subscriber is associated with a default data subscriber identity module (DDS) of the UE and the first subscriber is associated with a non-DDS of the UE.

In some aspects, an apparatus for wireless communication at a user equipment (UE) includes a memory; and one or more processors, coupled to the memory, configured to: establish a first call associated with a first subscriber of the UE; establish a second call associated with a second subscriber of the UE, wherein the first subscriber and the second subscriber are active contemporaneously, and wherein the first call and the second call are associated with a first radio access technology (RAT); identify a configuration that indicates a combination of calls that can be performed in association with multiple active calls for different subscribers for one or more RATs; identify a mobility event associated with an interruption to at least one of the first call and the second call, the mobility event involving switching the first subscriber to a second RAT; and perform a mitigation action based at least in part on the configuration and the mobility event.

In some aspects, the first call is a voice call over the first RAT, and performing the mitigation action comprises: enter a dual subscriber dual standby configuration; and suspend the second call until the first call concludes.

In some aspects, the one or more processors are further configured to: continue the first call on the second RAT.

In some aspects, the first call is a voice call and the second call is a data call.

In some aspects, the first call is a data call on the first RAT, and performing the mitigation action comprises: cancel the mobility event; and continue the first call and the second call on the first RAT.

In some aspects, the UE remains in the DSDA configuration after the mitigation action is performed.

In some aspects, the first call is a voice call and the mobility event is an Evolved Packet System fallback to the second RAT, and performing the mitigation action comprises: enter a dual subscriber dual standby configuration; and suspend the second call until the first call concludes.

In some aspects, the one or more processors are further configured to: perform the mobility event.

In some aspects, the first call is a mobile-originated or mobile-terminated voice call, and the second call is a voice call, and performing the mitigation action comprises: cancel the mobility event; and continue the second call.

In some aspects, the mobility event is an Evolved Packet System fallback to the second RAT.

In some aspects, the first call is an Enhanced 911 (E911) call and the mobility event is an Evolved Packet System fallback to the second RAT, and performing the mitigation action comprises: perform the mobility event; and disable a protocol entity associated with the second call.

In some aspects, the first call is a mobile-originated or mobile-terminated voice call and the second call is associated with a gaming service, the mobility event is an Evolved Packet System fallback to the second RAT, and performing the mitigation action comprises: cancel the mobility event; and continue the second call.

In some aspects, the first subscriber is associated with a default data subscriber identity module (DDS) of the UE and the second subscriber is associated with a non-DDS of the UE.

In some aspects, the second subscriber is associated with a default data subscriber identity module (DDS) of the UE and the first subscriber is associated with a non-DDS of the UE.

In some aspects, a non-transitory computer-readable medium storing a set of instructions for wireless communication includes one or more instructions that, when executed by one or more processors of a user equipment (UE), cause the UE to: establish a first call associated with a first subscriber of the UE; establish a second call associated with a second subscriber of the UE, wherein the first subscriber and the second subscriber are active contemporaneously, and wherein the first call and the second call are associated with a first radio access technology (RAT); identify a configuration that indicates a combination of calls that can be performed in association with multiple active calls for different subscribers for one or more RATs; identify a mobility event associated with an interruption to at least one of the first call and the second call, the mobility event involving switching the first subscriber to a second RAT; and perform a mitigation action based at least in part on the configuration and the mobility event.

In some aspects, the first call is a voice call over the first RAT, and performing the mitigation action comprises: enter a dual subscriber dual standby configuration; and suspend the second call until the first call concludes.

In some aspects, the one or more instructions further cause the UE to: continue the first call on the second RAT.

In some aspects, the first call is a voice call and the second call is a data call.

In some aspects, the first call is a data call on the first RAT, and performing the mitigation action comprises: cancel the mobility event; and continue the first call and the second call on the first RAT.

In some aspects, the UE remains in the DSDA configuration after the mitigation action is performed.

In some aspects, the first call is a voice call and the mobility event is an Evolved Packet System fallback to the second RAT, and performing the mitigation action comprises: enter a dual subscriber dual standby configuration; and suspend the second call until the first call concludes.

In some aspects, the one or more instructions further cause the UE to: perform the mobility event.

In some aspects, the first call is a mobile-originated or mobile-terminated voice call, and the second call is a voice call, and performing the mitigation action comprises: cancel the mobility event; and continue the second call.

In some aspects, the mobility event is an Evolved Packet System fallback to the second RAT.

In some aspects, the first call is an Enhanced 911 (E911) call and the mobility event is an Evolved Packet System fallback to the second RAT, and performing the mitigation action comprises: perform the mobility event; and disable a protocol entity associated with the second call.

In some aspects, the first call is a mobile-originated or mobile-terminated voice call and the second call is associated with a gaming service, the mobility event is an Evolved Packet System fallback to the second RAT, and performing the mitigation action comprises: cancel the mobility event; and continue the second call.

In some aspects, the first subscriber is associated with a default data subscriber identity module (DDS) of the UE and the second subscriber is associated with a non-DDS of the UE.

In some aspects, the second subscriber is associated with a default data subscriber identity module (DDS) of the UE and the first subscriber is associated with a non-DDS of the UE.

In some aspects, an apparatus for wireless communication includes means for establishing a first call associated with a first subscriber of the apparatus; means for establishing a second call associated with a second subscriber of the apparatus, wherein the first subscriber and the second subscriber are active contemporaneously, and wherein the first call and the second call are associated with a first radio access technology (RAT); means for identifying a configuration that indicates a combination of calls that can be performed in association with multiple active calls for different subscribers for one or more RATs; means for identifying a mobility event associated with an interruption to at least one of the first call and the second call, the mobility event involving switching the first subscriber to a second RAT; and means for performing a mitigation action based at least in part on the configuration and the mobility event.

In some aspects, the first call is a voice call over the first RAT, and performing the mitigation action comprises: means for entering a dual subscriber dual standby configuration; and means for suspending the second call until the first call concludes.

In some aspects, the apparatus includes means for continuing the first call on the second RAT.

In some aspects, the first call is a voice call and the second call is a data call.

In some aspects, the first call is a data call on the first RAT, and performing the mitigation action comprises: means for canceling the mobility event; and means for continuing the first call and the second call on the first RAT.

In some aspects, the apparatus remains in the DSDA configuration after the mitigation action is performed.

In some aspects, the first call is a voice call and the mobility event is an Evolved Packet System fallback to the second RAT, and performing the mitigation action comprises: means for entering a dual subscriber dual standby configuration; and means for suspending the second call until the first call concludes.

In some aspects, the apparatus includes means for performing the mobility event.

In some aspects, the first call is a mobile-originated or mobile-terminated voice call, and the second call is a voice call, and performing the mitigation action comprises: means for canceling the mobility event; and means for continuing the second call.

In some aspects, the mobility event is an Evolved Packet System fallback to the second RAT.

In some aspects, the first call is an Enhanced 911 (E911) call and the mobility event is an Evolved Packet System fallback to the second RAT, and performing the mitigation action comprises: means for performing the mobility event; and means for disabling a protocol entity associated with the second call.

In some aspects, the first call is a mobile-originated or mobile-terminated voice call and the second call is associated with a gaming service, the mobility event is an Evolved Packet System fallback to the second RAT, and performing the mitigation action comprises: means for canceling the mobility event; and means for continuing the second call.

In some aspects, the first subscriber is associated with a default data subscriber identity module (DDS) of the apparatus and the second subscriber is associated with a non-DDS of the apparatus.

In some aspects, the second subscriber is associated with a default data subscriber identity module (DDS) of the apparatus and the first subscriber is associated with a non-DDS of the apparatus.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
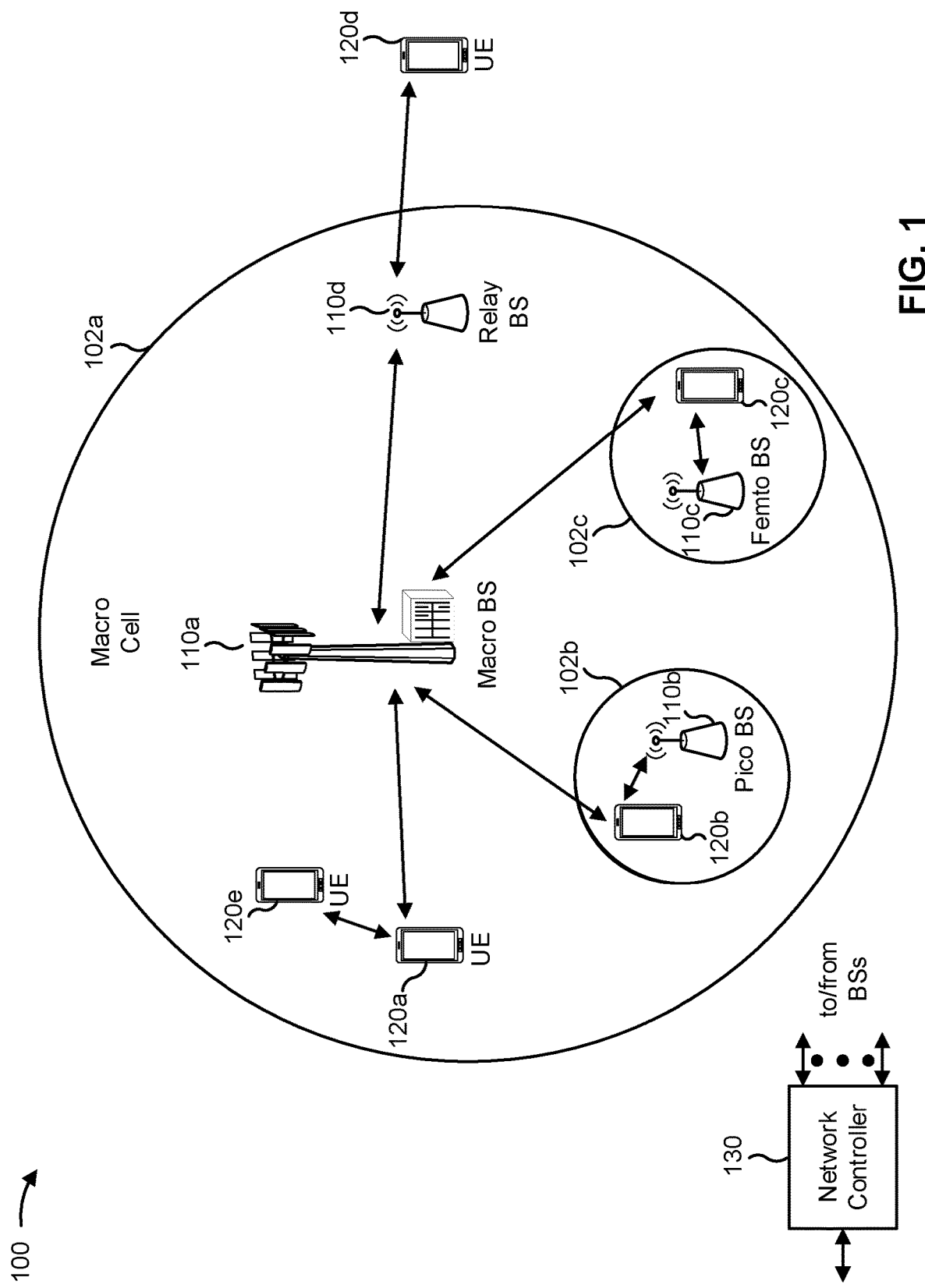
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
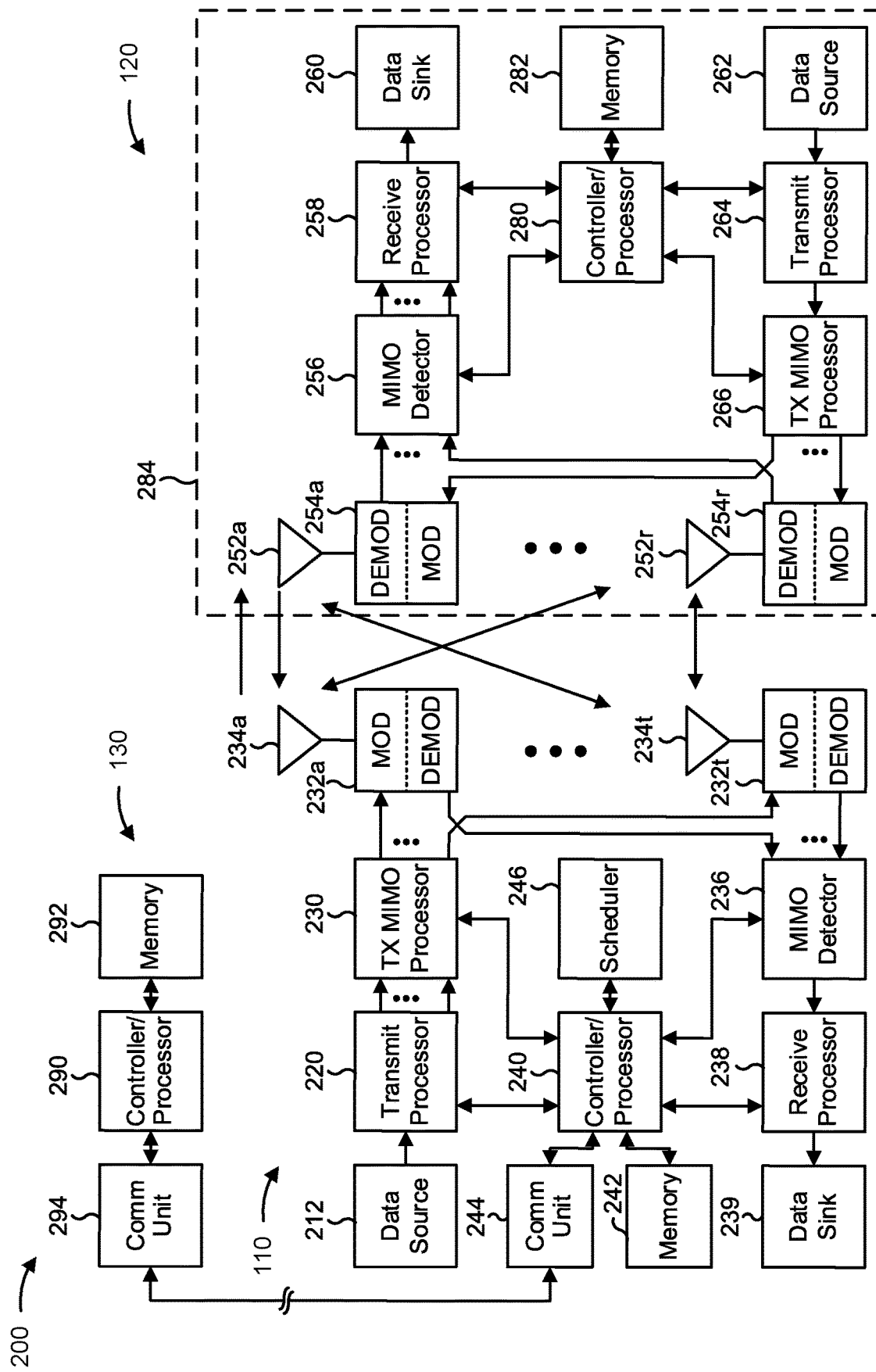
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with mobility event handling for a DSDA UE, as described in more detail elsewhere herein. For example, controller/processor 240 of base station 110, controller/processor 280 of UE 120, and/or any other component(s) of FIG. 2 may perform or direct operations of, for example, process 1100 of FIG. 11 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11 and/or other processes as described herein. In some aspects, executing instructions may include running the instructions, converting the instructions, compiling the instructions, and/or interpreting the instructions.

In some aspects, the UE includes means for establishing a first call associated with a first subscriber of the UE; means for establishing a second call associated with a second subscriber of the UE, wherein the first subscriber and the second subscriber are associated with a DSDA configuration, and wherein the first call and the second call are associated with a first RAT; means for identifying a configuration that indicates a combination of calls that can be performed in association with the DSDA configuration for one or more RATs; means for identifying a mobility event that impacts an interrupted call, of the first call and the second call, the mobility event involving switching the second subscriber to a second RAT; or means for performing a mitigation action based at least in part on the configuration and the mobility event. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
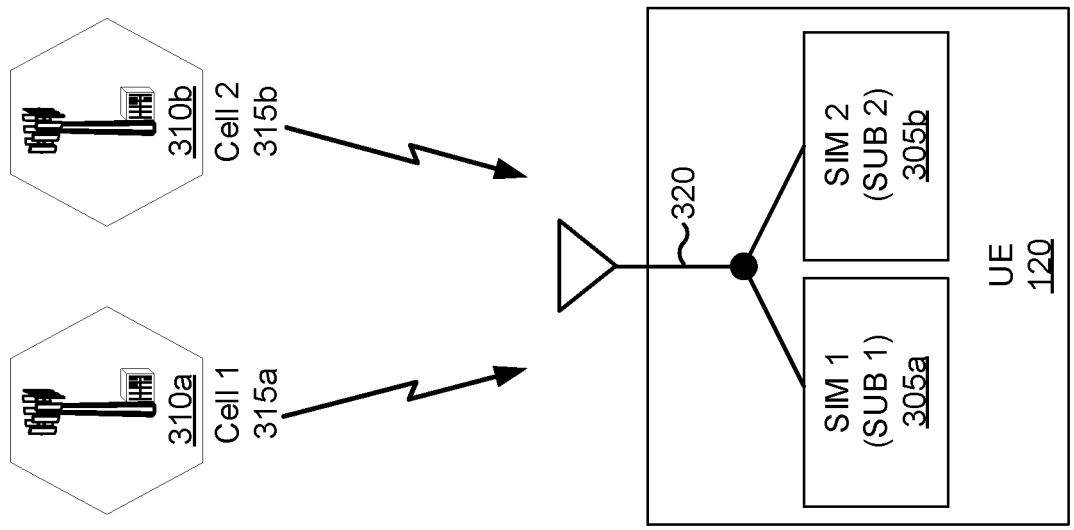
FIG. 3 is a diagram illustrating an example 300 of a multiple subscriber identity module (multi-SIM) UE, in accordance with the present disclosure.
Figure 4:
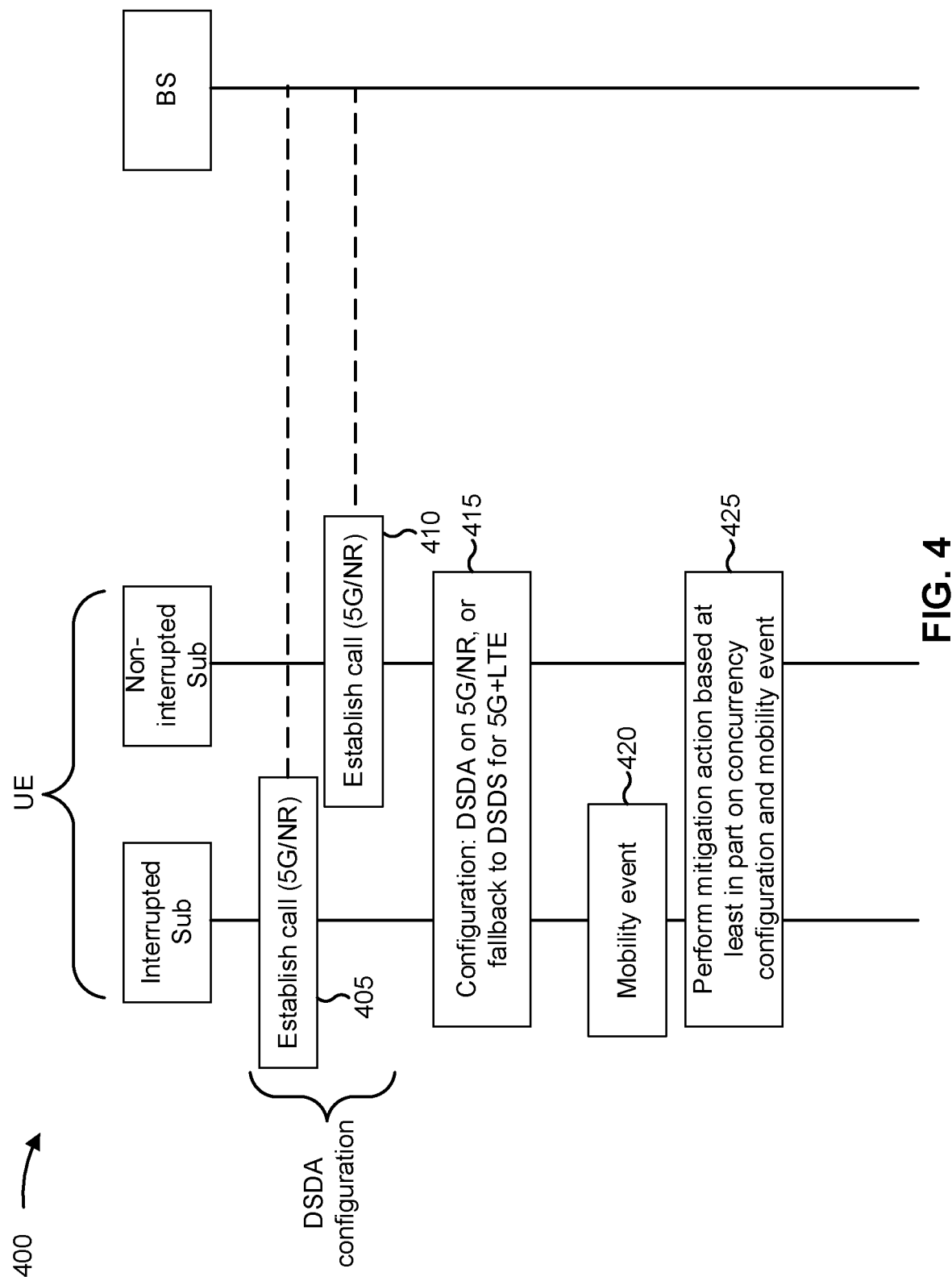
FIGS. 4-10 are diagrams illustrating examples of mobility event handling for a dual subscriber dual active (DSDA) UE, in accordance with the present disclosure.

FIG. 3 is a diagram illustrating an example 300 of a multiple subscriber identity module (multi-SIM) UE, in accordance with the present disclosure. As shown in FIG. 3, a UE 120 may be a multi-SIM UE that includes multiple SIMS (two or more SIMs), shown as a first SIM 305a and a second SIM 305b. The first SIM 305a may be associated with a first subscription or subscriber (shown as SUB 1), and the second SIM 305b may be associated with a second subscription or subscriber (shown as SUB 2). A subscription may include a subscription with a network operator (for example, a mobile network operator (MNO)) that enables the UE 120 to access a wireless network (for example, a radio access network (RAN)) associated with the network operator. Generally, "subscriber" is used interchangeably with "SIM" herein.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, a video telephony service, or a gaming service, among other examples. Some of these services may be associated with Quality of Service (QoS) requirements, so associated traffic may be associated with a QoS level. Others of these services may not be associated with QoS requirements, so associated traffic may not be associated with a QoS level or may be associated with a best-effort QoS level.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315*a* and the second cell 315*b* may be provided by the same base station. Thus, in some aspects, the first base station 310*a* and the second base station 310*b* may be integrated into a single base station.

In some cases, the UE 120 may be a multi-SIM UE, such as a dual SIM dual active (DSDA) UE, among other examples. A multi-SIM UE may be capable of switching between two separate mobile network services or concurrently using two separate mobile network services, may include hardware for maintaining multiple connections (for example, one connection per SIM) in a standby state, or may include hardware (for example, multiple transceivers) for maintaining multiple network connections at the same time, among other examples. A DSDA UE may be capable of communicating on two connections at a given time, such as for multiple communications associated with different RATs or multiple communications of a single RAT. The communication on two connections may be handled by a radio frequency (RF) hardware front-end module (sometimes referred to as a radio frequency front-end (RFFE)), which is illustrated in a general sense by reference number 320. The RF hardware front-end module may include, for example, one or more power amplifiers (PAs), one or more low noise amplifiers (LNAs), one or more band filters, one or more band N-plexers, one or more band switches, one or more antenna switches, or the like.

In a multi-SIM mode such as a DSDA mode, a default data SIM (DDS) subscriber may perform data activity, call activity, or the like. A non-DDS subscriber may perform call-related activity, small data activity (e.g., short message service (SMS) activity or multimedia message service (MMS) activity), or similar tasks. "Subscriber" is used interchangeably with "SIM" herein.

In some cases, a first service associated with a first subscriber and a second service associated with a second subscriber may be concurrently active (e.g., may have concurrently established communications). In such a situation, the UE may perform concurrent transmissions for two subscribers, concurrent receptions for two subscribers, or transmission for a first subscriber and receptions for a second subscriber. For example, the concurrently active services may communicate on a shared RF hardware front-end module or may share an antenna switch.

As mentioned above, a DSDA configuration allows a UE to have multiple concurrently active services associated with multiple subscribers, such as a first service associated with a DDS subscriber and a second service associated with a non-DDS subscriber. Thus, a UE may be capable of establishing calls, such as voice calls (e.g., mobile-originated (MO) and mobile-terminated (MT) calls, data calls, Enhanced 911 calls, gaming calls, calls associated with a threshold quality of service, or the like), for multiple concurrently active services. A call may be associated with a RAT. For example, a call may be placed via 5G/NR (in which case the call is in accordance with 5G/NR protocol and is associated with a 5G/NR core network such as a 5G Core (5GC)) or via LTE (in which case the call is in accordance with LTE protocol and is associated with an LTE core network such as an Evolved Packet System (EPS)). However, a UE may have limitations regarding combinations of calls and/or RATs. For example, the UE may be capable of placing multiple concurrent calls via a single RAT (such as 5G/NR) as part of a DSDA configuration, but the UE may not be capable of DSDA operation while placing multiple concurrent calls via different RATs (such as a first call via LTE and a second call via 5G/NR).

A UE may initiate multiple calls in a fashion that is compatible with a configuration of the UE (where a configuration indicates combinations of calls on one or more RATs that can be performed for a DSDA configuration of the UE). In some aspects, the configuration may be referred to as a concurrency configuration. For example, the UE may initiate a first call and a second call on a 5G/NR RAT, which is compatible with the configuration of the UE. However, a mobility operation may involve switching a RAT associated with one or more of the calls such that the combination of RATs after the mobility operation does not satisfy the configuration. For example, a subscriber associated with one of the first call or the second call (referred to herein as an interrupted subscriber or SIM) may be switched from a RAT associated with the first call and the second call to another RAT, which may exceed the capabilities of the UE with regard to DSDA operation. If the capabilities of the UE are exceeded, one or more of the first call or the second call may be dropped, or one or more of the first call or the second call may experience unacceptable performance, thereby degrading throughput and reliability and violating quality of service rules associated with the services of the first subscriber and/or the second subscriber.

Some techniques and apparatuses described herein provide management of multiple active calls of a UE associated with a DSDA configuration in view of a mobility event. For example, the UE may perform a mitigation action associated with one or more of a first call or a second call based at least in part on a configuration of the UE and/or a DSDA configuration (e.g., which calls are active, which RATs are associated with the active calls, etc.). Thus, techniques and apparatuses described herein provide procedures for handling a mobility event with regard to an interrupted subscriber and a non-interrupted subscriber associated with a DSDA configuration. In this way, the UE may mitigate or prevent impact to ongoing calls where appropriate, and the UE may ensure that higher-priority calls are continued while lower-priority calls, best-effort calls, or the like, can be deprioritized. Thus, throughput and reliability are improved, DSDA operation is rendered more reliable, and quality of service adherence is improved.

As indicated above, FIG. 3 is provided as an example. Other examples may differ from what is described with regard to FIG. 3.

FIGS. 4-9 are diagrams illustrating examples 400, 500, 600, 700, 800, and 900 of mobility event handling for a DSDA UE, in accordance with the present disclosure. As shown, the examples 400, 500, 600, 700, 800, and 900 include an interrupted subscriber (Sub) and a non-interrupted subscriber of a UE (e.g., UE 120). The interrupted subscriber may be one of a DDS subscriber or a non-DDS subscriber of the UE. The interrupted subscriber may be associated with a mobility event, as described below. The non-interrupted subscriber may be the other of the DDS subscriber or the non-DDS subscriber (e.g., if the interrupted subscriber is a DDS subscriber, the non-interrupted subscriber may be a non-DDS subscriber, and if the interrupted subscriber is a non-DDS subscriber, the non-interrupted subscriber may be a DDS subscriber). Thus, the techniques described in examples 400, 500, 600, 700, 800, and 900 can be applied whether the interrupted subscriber is a DDS subscriber or a non-DDS subscriber. Furthermore, these examples include a base station. The examples 400, 500, 600, 700, 800, and 900 can include a plurality of base stations. For example, the interrupted subscriber may have a call with a first base station and the non-interrupted subscriber may have a call with a second base station different from the first base station.

As shown by reference number 405, the interrupted subscriber may establish a first call. As shown by reference number 410, the non-interrupted subscriber may establish a second call. "First call" and "second call" are used to differentiate calls associated with the interrupted subscriber and the non-interrupted subscriber, and do not necessarily indicate relative priority of the calls, an order of establishment of the calls, whether the calls are associated with a DDS SIM or a non-DDS SIM, or other information regarding the calls. As shown, the first call and the second call are associated with a same RAT (5G/NR, in examples 400, 500, 600, 700, 800, and 900, though the calls may be associated with another RAT in some aspects). As shown, the first call and the second call are associated with a DSDA configuration, since the first call and the second call are associated with different subscribers and are concurrently active.

The UE may be associated with a configuration, shown by reference number 415. In some aspects, the configuration may indicate a combination of calls, such as a combination of RATs associated with active calls, that can be supported by the UE in a DSDA configuration. As shown, the configuration may indicate that the UE can perform a plurality of calls in a DSDA configuration on 5G/NR, and that the UE cannot concurrently perform a first call on 5G/NR and a second call on LTE. For example, the configuration may indicate that the UE is to fall back to a dual subscriber dual standby (DSDS) configuration (in which only one of the first call or the second call is active at a given time) if the UE is to perform one call via a 5G/NR RAT and another call via an LTE RAT. In some aspects, the configuration may be preconfigured for the UE, such as by an original equipment manufacturer of the UE and/or in accordance with a wireless communication specification. In other aspects, the configuration may be signaled to the UE, such as in association with connecting to the base station.

As shown by reference number 420, the UE may identify a mobility event associated with the interrupted subscriber. In some aspects, the call associated with an interrupted subscriber may be subject to interruption due to the mobility event. For example, the UE may receive signaling indicating that a mobility event is to be performed for. A mobility event is an event involving switching a subscriber (whether the interrupted subscriber or the non-interrupted subscriber) from operation on a first RAT (such as 5G/NR in example 400) to a second RAT (such as LTE). In some cases, the mobility event may interrupt the interrupted subscriber due to the configuration of the UE. For example, the UE may not be capable of supporting the combination of calls and RATs that would arise after the mobility event is performed. Thus, if the mobility event is performed, it may be expected that at least one of the first call and the second call will be interrupted or negatively impacted.

In some aspects, the mobility event may be a handover, such as a packet-switched handover from 5G/NR to LTE. A handover involves transferring a UE from a first cell to a second cell, where the first cell is associated with a first RAT and the second cell is associated with a second RAT. The first cell may provide a configuration for the handover identifying the target cell. In some aspects, the UE may identify the handover based at least in part on the configuration, based at least in part on a handover instruction, based at least in part on a measurement configuration associated with identifying the target cell, or the like.

In some aspects, the mobility event may be a redirection. In a redirection, the UE may change a connection state from a connected mode (such as a radio resource control (RRC) connected mode) to an idle state (such as an RRC idle mode). In this case, the UE may release a connection associated with the interrupted subscriber on the 5G/NR RAT and may redirect onto a target cell associated with the LTE RAT based at least in part on a carrier frequency or a cell identifier in a message (such as an RRC connection release message). In some aspects, the UE may identify the redirection based at least in part on the message.

In some aspects, the mobility event may be an EPS fallback to the LTE RAT. An EPS fallback is a procedure by which a voice call, established (or in the process of being established) on a 5G/NR RAT, can be reselected to an LTE cell or can be handed over from 5G/NR to LTE. For example, the UE's context may be transferred from the 5G/NR core network to the LTE core network, or a handover may be performed from the 5G/NR core network to the LTE core network. In this case, the UE may identify the EPS fallback based at least in part on a message indicating to reselect to the LTE cell or a handover preparation message, a forward relocation request, or a handover request message.

As shown by reference number 425, the UE may perform a mitigation action based at least in part on the configuration and the mobility event. For example, the mitigation action may be based at least in part on one or more of a type of call of the first call, a type of call of the second call, the configuration, the mobility event, and/or one or more other factors. Particular examples of mitigation actions for combinations of calls are provided in examples 500, 600, 700, 800, and 900. In this way, the UE may mitigate impact on the interrupted subscriber and/or the non-interrupted subscriber by performing a mitigation action based at least in part on the mobility event. Thus, throughput and reliability of calls is improved and conformance with quality of service requirements for calls is improved.

Figure 5:
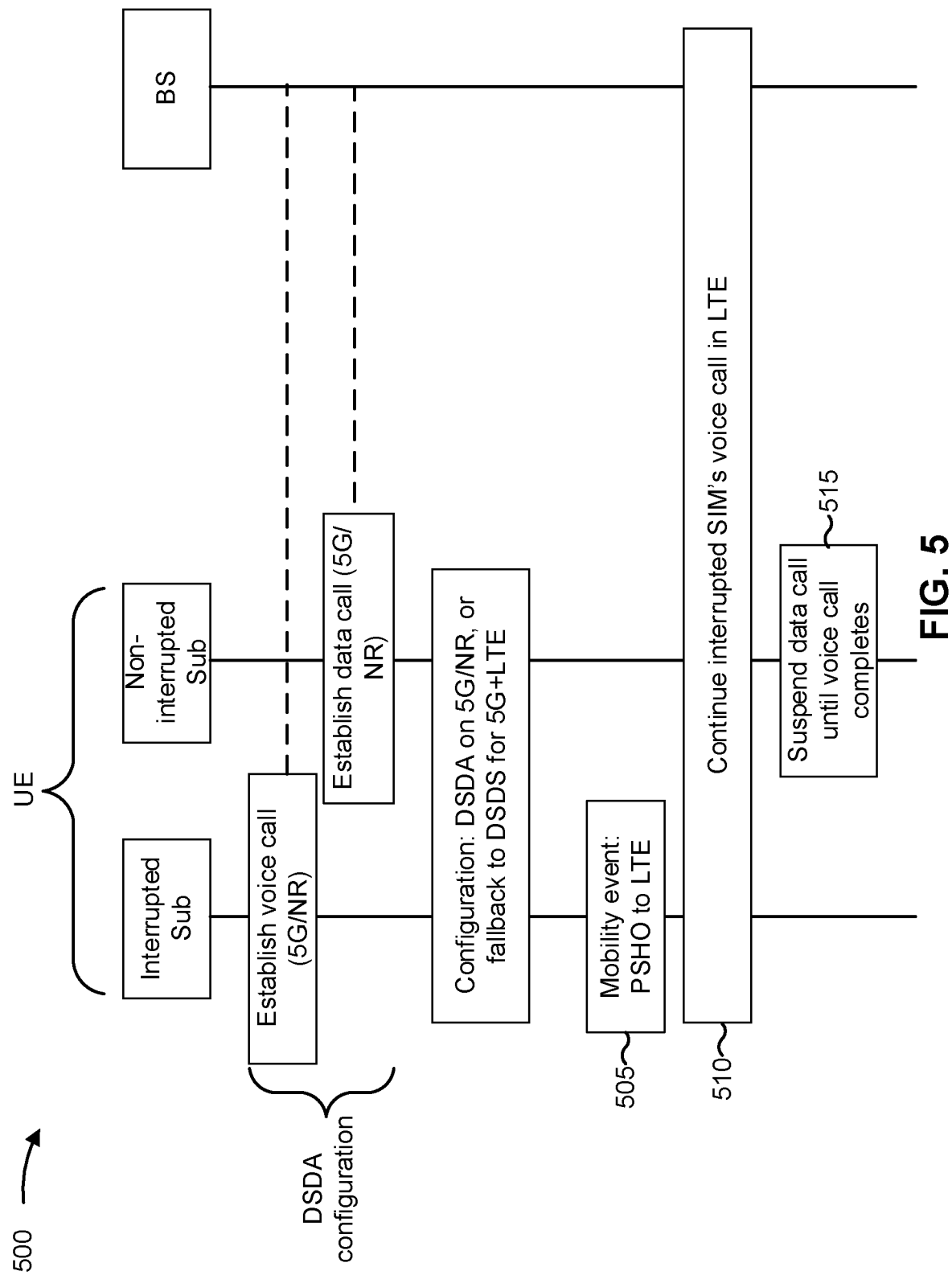

FIG. 5 illustrates an example 500 relating to a case where the interrupted subscriber is associated with a voice call and the mobility event is a handover (such as a packet-switched handover (PSHO)). As shown, the UE may establish a voice call on the interrupted subscriber and a data call on the non-interrupted subscriber. The voice call may include, for example, a Voice over NR (VoNR) call or the like. The data call may include, for example, a session associated with a data communication over service, such as an over-the-top calling service, Internet traffic, or the like. As further shown, the UE of example 500 is associated with the configuration described with regard to FIG. 4.

As shown by reference number 505, the UE may identify a mobility event. In example 500, the mobility event is a PSHO from 5G/NR to LTE associated with the interrupted subscriber. The mitigation action of example 500 is shown by reference numbers 510 and 515. In example 500, the UE may enter a DSDS mode based at least in part on the configuration. For example, as shown by reference number 510, the UE may continue the voice call of the interrupted subscriber in LTE. Furthermore, as shown by reference number 515, the UE may suspend the data call. For example, the UE may suspend the data call until the voice call associated with the interrupted subscriber is completed. In this way, the UE may prioritize the voice call over the data call, which improves performance of the voice call and reduces the likelihood of radio link failure associated with the voice call.

Figure 6:
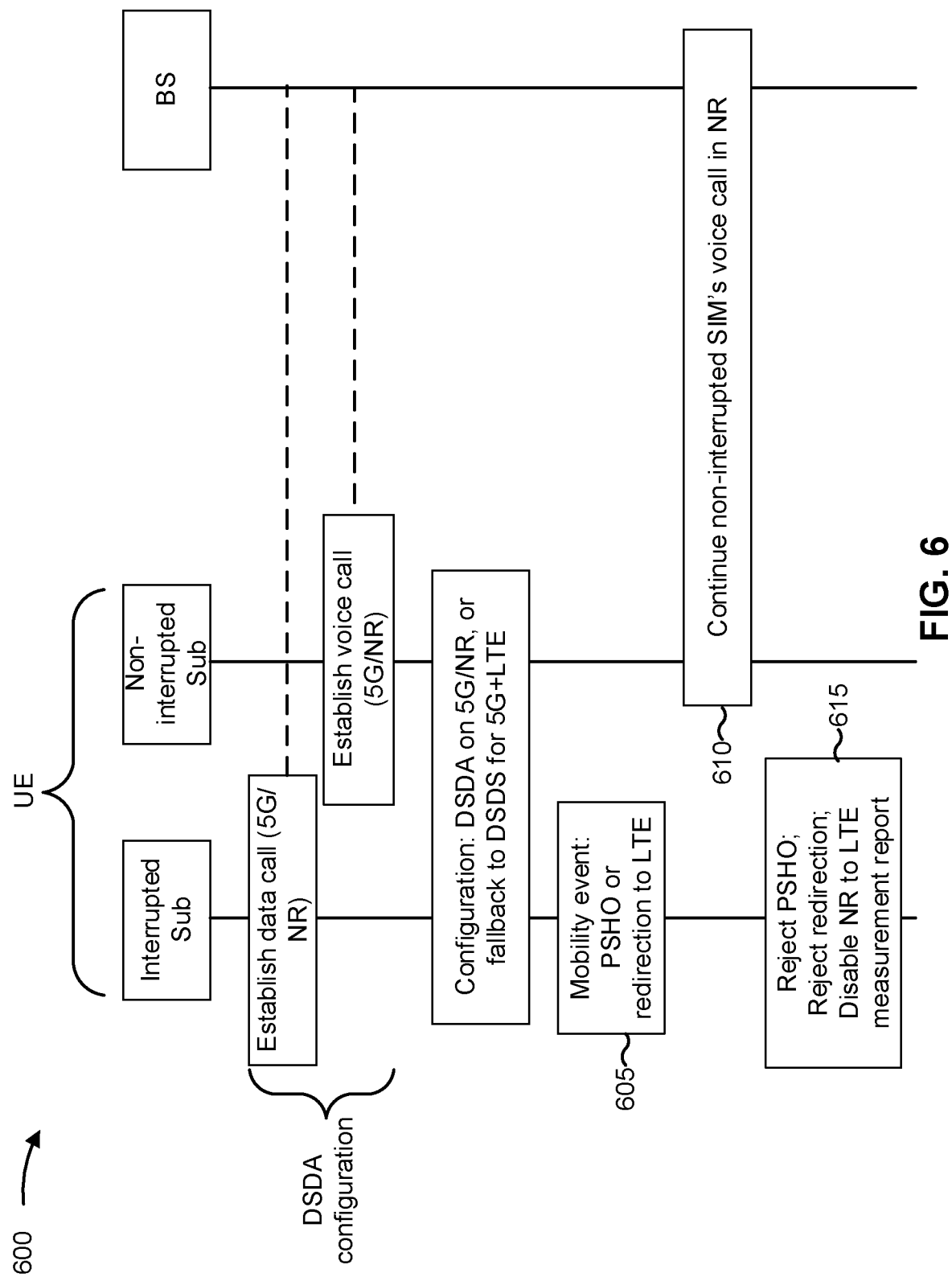

FIG. 6 illustrates an example 600 relating to a case where the interrupted subscriber is associated with a data call and the mobility event is a handover (such as a PSHO) or a redirection to LTE. As shown, the UE may establish a data call on the interrupted subscriber and a voice call on the non-interrupted subscriber. The voice call may include, for example, a VoNR call or the like. The data call may include, for example, a session associated with a data communication over service, such as an over-the-top calling service, Internet traffic, or the like. As further shown, the UE of example 600 is associated with the configuration described with regard to FIG. 4.

As shown by reference number 605, the UE may identify a mobility event. In example 600, the mobility event is a PSHO from 5G/NR to LTE associated with the interrupted subscriber, or a redirection to LTE associated with the interrupted subscriber. The mitigation action of example 600 is shown by reference numbers 610 and 615. In example 600, the UE may remain in the DSDA configuration. For example, as shown by reference number 610, the UE may continue the voice call of the non-interrupted subscriber in 5G/NR. Furthermore, as shown by reference number 615, the UE may cancel the mobility event. For example, the UE may reject the PSHO to LTE (such as by declaring radio link failure and reestablishing a connection associated with the subscriber on the 5G/NR RAT, or by locally releasing the connection with the 5G/NR RAT). As another example, the UE may reject the redirection to LTE. For example, the UE may release a connection associated with the interrupted subscriber, and the UE may ignore the redirection to LTE. If the BS attempts to establish a connection with the first subscriber via the LTE RAT, then the UE may disable an NR-to-LTE measurement report associated with the PSHO or redirection. In some aspects, the UE may disable an NR-to-LTE measurement report associated with the PSHO or redirection based at least in part on being in the DSDA configuration associated with the configuration (e.g., before the mobility event is identified). In this way, the UE may prioritize the voice call over the data call by staying in the DSDA configuration, since switching the data call to LTE may affect performance of the voice call.

Figure 7:
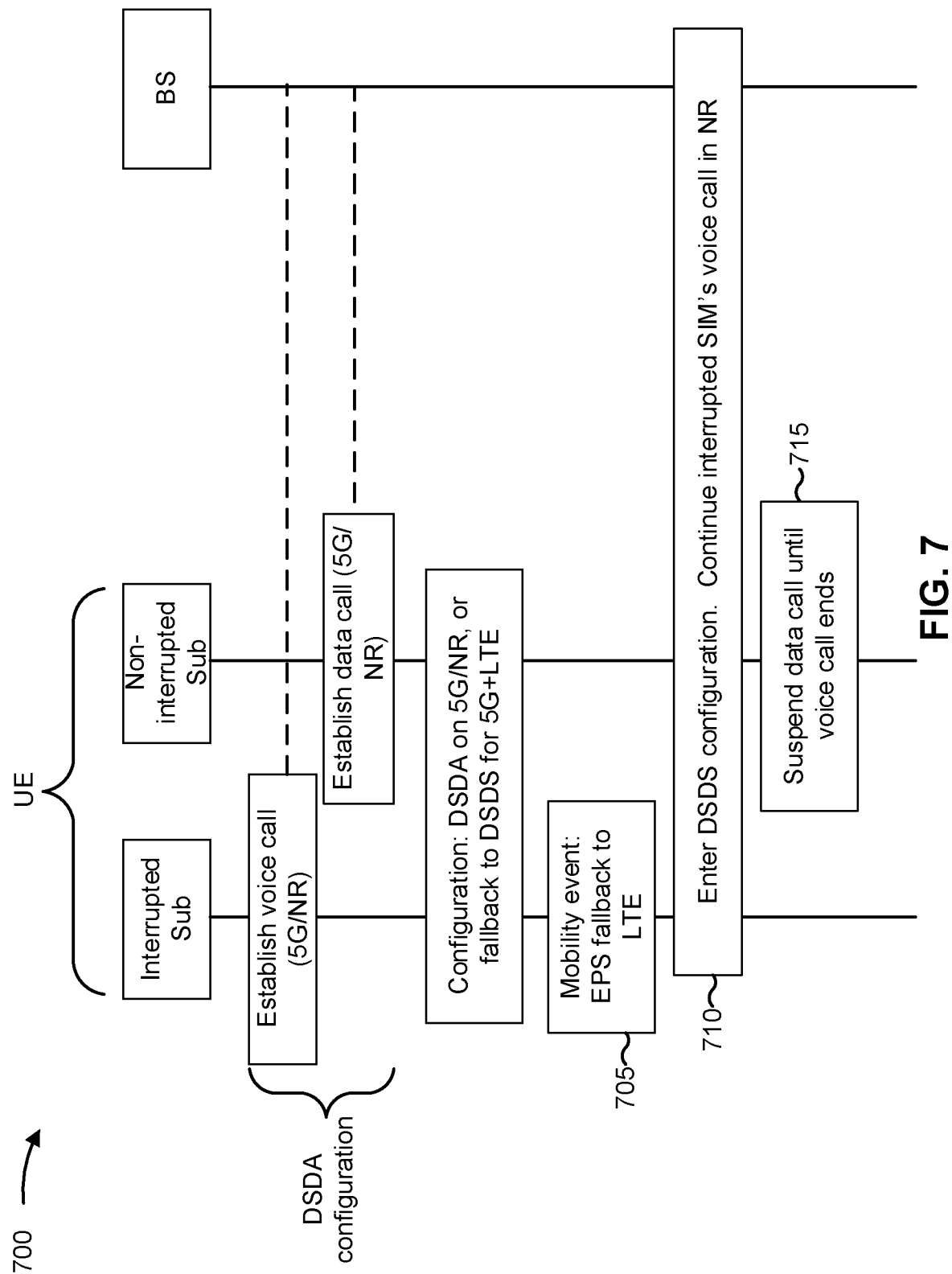

FIG. 7 illustrates an example 700 relating to a case where the interrupted subscriber is associated with a voice call (such as an MO/MT voice call) and the mobility event is an EPS fallback to LTE. As shown, the UE may establish a voice call on the interrupted subscriber and a data call on the non-interrupted subscriber. The data call may include, for example, a session associated with a data communication over service, such as an over-the-top calling service, Internet traffic, or the like. As further shown, the UE of example 700 is associated with the configuration described with regard to FIG. 4.

As shown by reference number 705, the UE may identify a mobility event. In example 700, the mobility event is an EPS fallback to LTE. The mitigation action of example 700 is shown by reference numbers 710 and 715. In example 700, the UE may enter the DSDS configuration and may prioritize the voice call. For example, as shown by reference number 710, the UE may continue setup and/or performance of the voice call of the interrupted subscriber in LTE. Furthermore, as shown by reference number 715, the UE may suspend the data call on the non-interrupted subscriber. For example, the UE may suspend the data call on the non-interrupted subscriber until the voice call of the interrupted subscriber ends. In this way, the UE may prioritize the voice call over the data call by performing the EPS fallback, which facilitates the performance of the voice call in a situation where 5G/NR coverage is limited.

Figure 8:
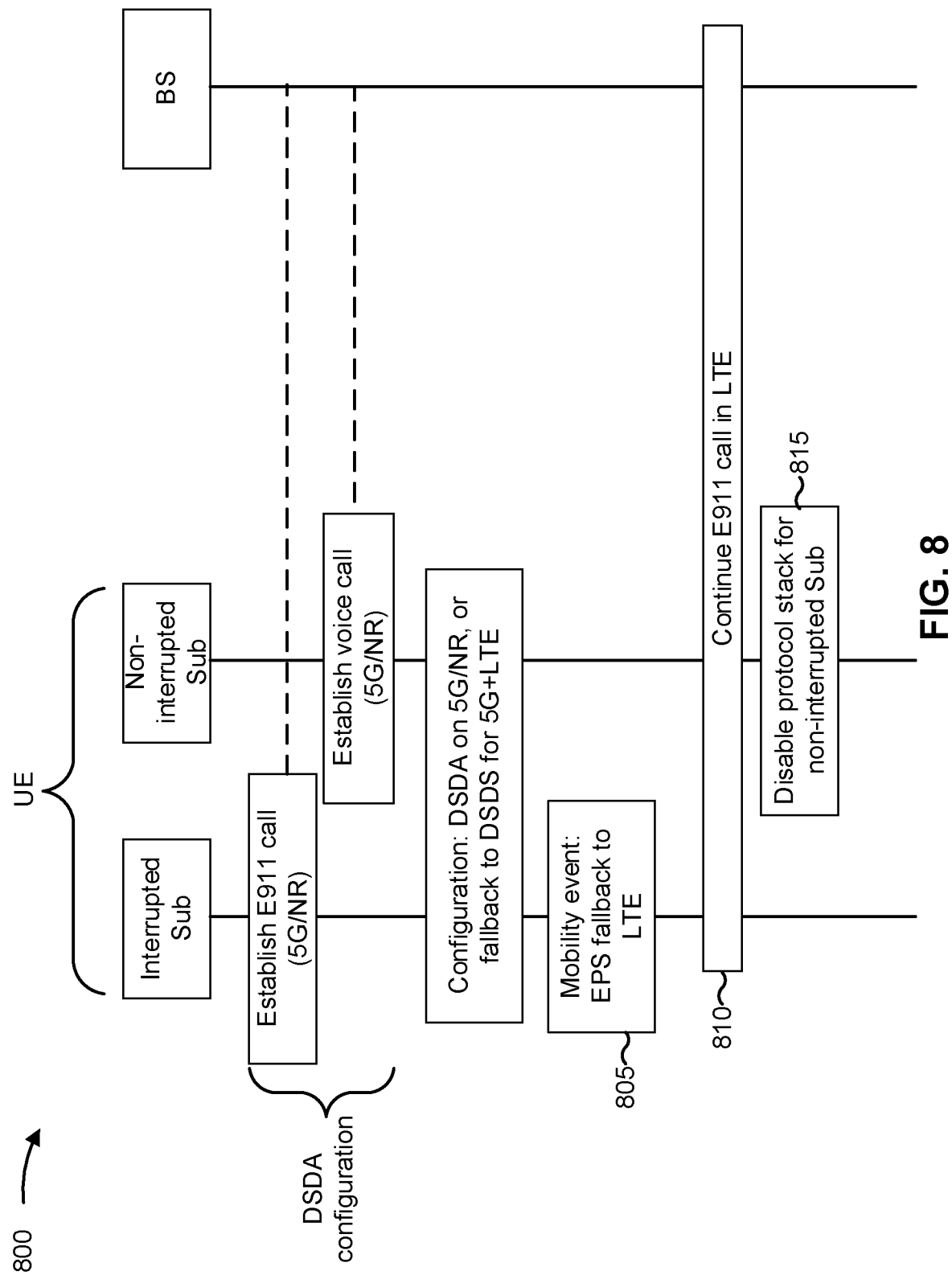

FIG. 8 illustrates an example 800 relating to a case where the interrupted subscriber is associated with an E911 call and the mobility event is an EPS fallback to LTE. An E911 call is a call placed via an E911 system. Generally, E911 calls are treated with a higher priority than other communications of the UE. As shown, the UE may establish an E911 call on the interrupted subscriber and a voice call on the non-interrupted subscriber. As further shown, the UE of example 800 is associated with the configuration described with regard to FIG. 4.

As shown by reference number 805, the UE may identify a mobility event. In example 800, the mobility event is an EPS fallback to LTE. The mitigation action of example 800 is shown by reference numbers 810 and 815. In example 800, the UE may prioritize the voice call by facilitating the EPS fallback. For example, as shown by reference number 810, the UE may continue setup and/or performance of the E911 call of the interrupted subscriber in LTE. Furthermore, as shown by reference number 815, the UE may suspend the voice call on the non-interrupted subscriber. For example, the UE may disable a stack (e.g., a protocol stack) associated with the non-interrupted subscriber such that the UE's inability to concurrently perform the E911 call on LTE and the voice call on 5G/NR does not negatively impact the E911 call. In this way, the UE may prioritize the E911 call over DSDA operation by performing the EPS fallback and disabling the non-interrupted subscriber's stack, which facilitates the performance of the E911 call in a situation where 5G/NR coverage is limited.

Figure 9:
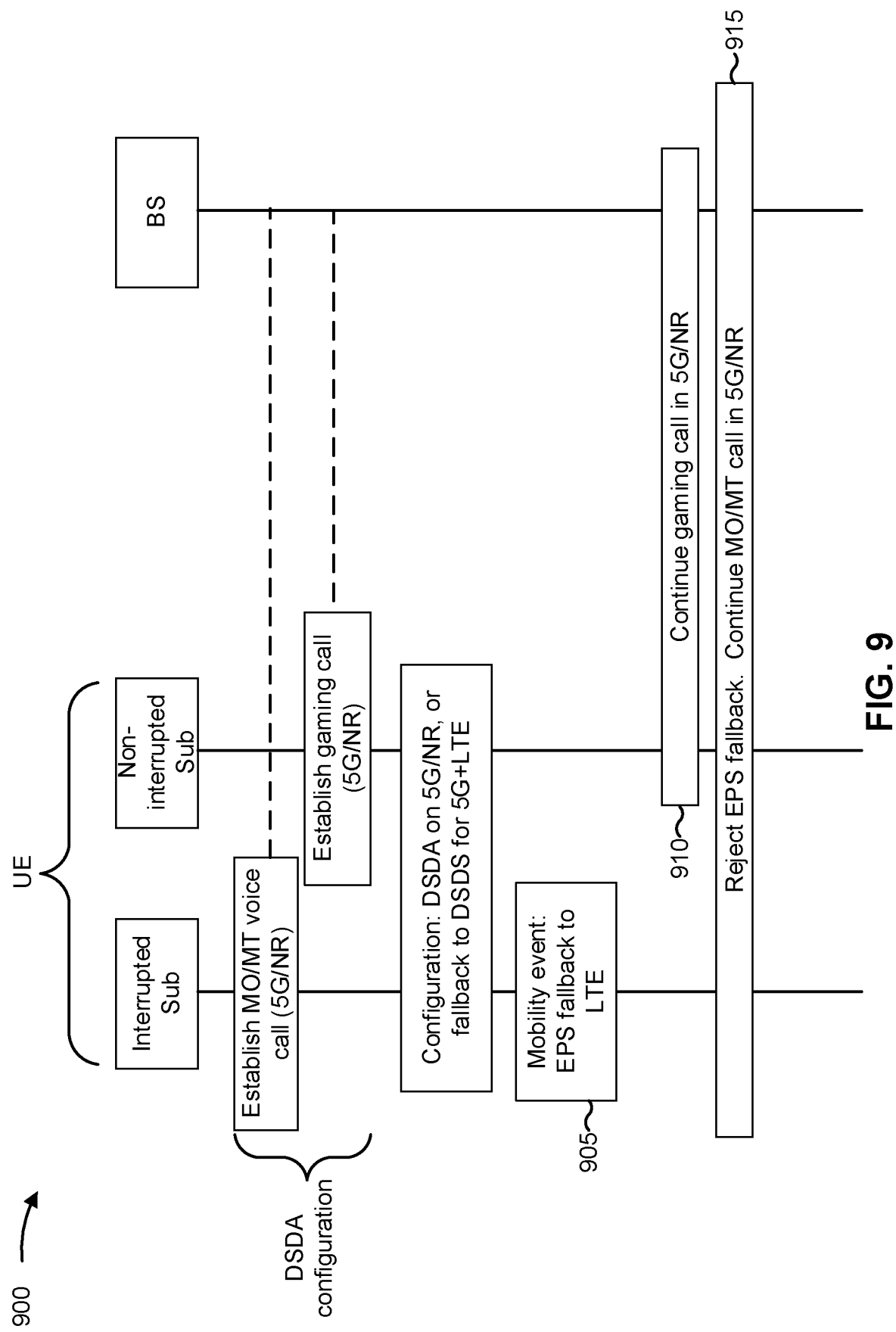

FIG. 9 illustrates an example 900 relating to a case where the interrupted subscriber is associated with a voice call (such as an MO/MT voice call), the non-interrupted subscriber is associated with a gaming service (shown as a gaming call), and the mobility event is an EPS fallback to LTE. As shown, the UE may establish a voice call on the interrupted subscriber and a gaming call on the non-interrupted subscriber. The gaming call may include, for example, a session associated with a gaming service. The gaming service may be associated with a quality of service requirement, such as a latency requirement, a reliability requirement, or the like. An interruption to the gaming call associated with the non-interrupted subscriber may cause violation of such a quality of service requirement. As further shown, the UE of example 900 is associated with the configuration described with regard to FIG. 4.

As shown by reference number 905, the UE may identify a mobility event. In example 900, the mobility event is an EPS fallback to LTE. The mitigation action of example 900 is shown by reference numbers 910 and 915. In example 900, the UE may prioritize the gaming call, and the UE may therefore stay in the DSDA configuration. For example, as shown by reference number 910, the UE may continue setup and/or performance of the gaming call of the non-interrupted subscriber in 5G/NR. Furthermore, as shown by reference number 915, the UE may reject the EPS fallback associated with the interrupted subscriber. For example, the UE may continue the voice call on the interrupted subscriber in 5G/NR. As another example, if the EPS fallback uses a handover or a redirection, the UE may apply one or more of the techniques for cancelling a handover or a redirection described in connection with FIGS. 5 and 6, above. In this way, the UE may reject moving to LTE for the voice call to preserve an ongoing gaming call, which improves adherence with a quality of service requirement for the gaming call and improves throughput and reliability of the gaming call.

As indicated above, FIGS. 4-9 are provided as examples. Other examples may differ from what is described with regard to FIGS. 4-9.

Figure 10:
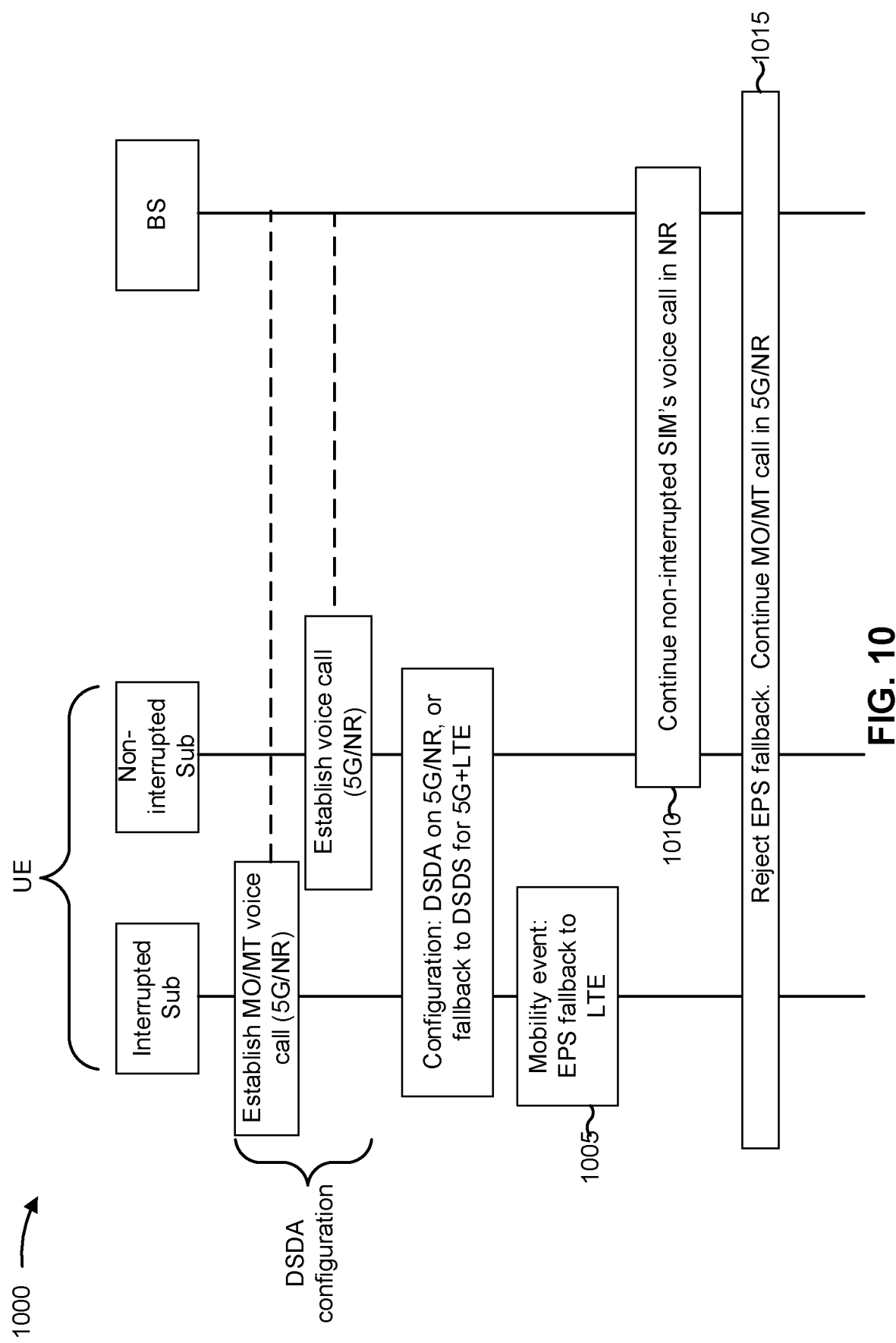

FIG. 10 illustrates an example 1000 relating to a case where the interrupted subscriber is associated with an MO/MT voice call and the mobility event is an EPS fallback to LTE. As shown, the UE may establish an MO/MT voice call on the interrupted subscriber and a voice call on the non-interrupted subscriber. As further shown, the UE of example 1000 is associated with the configuration described with regard to FIG. 4.

As shown by reference number 1005, the UE may identify a mobility event. In example 1000, the mobility event is an EPS fallback to LTE. The mitigation action of example 1000 is shown by reference numbers 1010 and 1015. In example 1000, the UE may cancel the EPS fallback. For example, as shown by reference number 1010, the UE may continue setup and/or performance of the MO/MT voice call of the non-interrupted subscriber in 5G/NR. Furthermore, as shown by reference number 1015, the UE may reject the EPS fallback associated with the interrupted subscriber. For example, the UE may continue the MO/MT voice call on the interrupted subscriber in 5G/NR. As another example, if the EPS fallback uses a handover or a redirection, the UE may apply one or more of the techniques for cancelling a handover or a redirection described in connection with FIGS. 5 and 6, above. In this way, the UE may reject moving to LTE for the MO/MT voice call to preserve an ongoing voice call, which improves adherence with a quality of service requirement for the voice call and improves throughput and reliability of the voice call.

Figure 11:
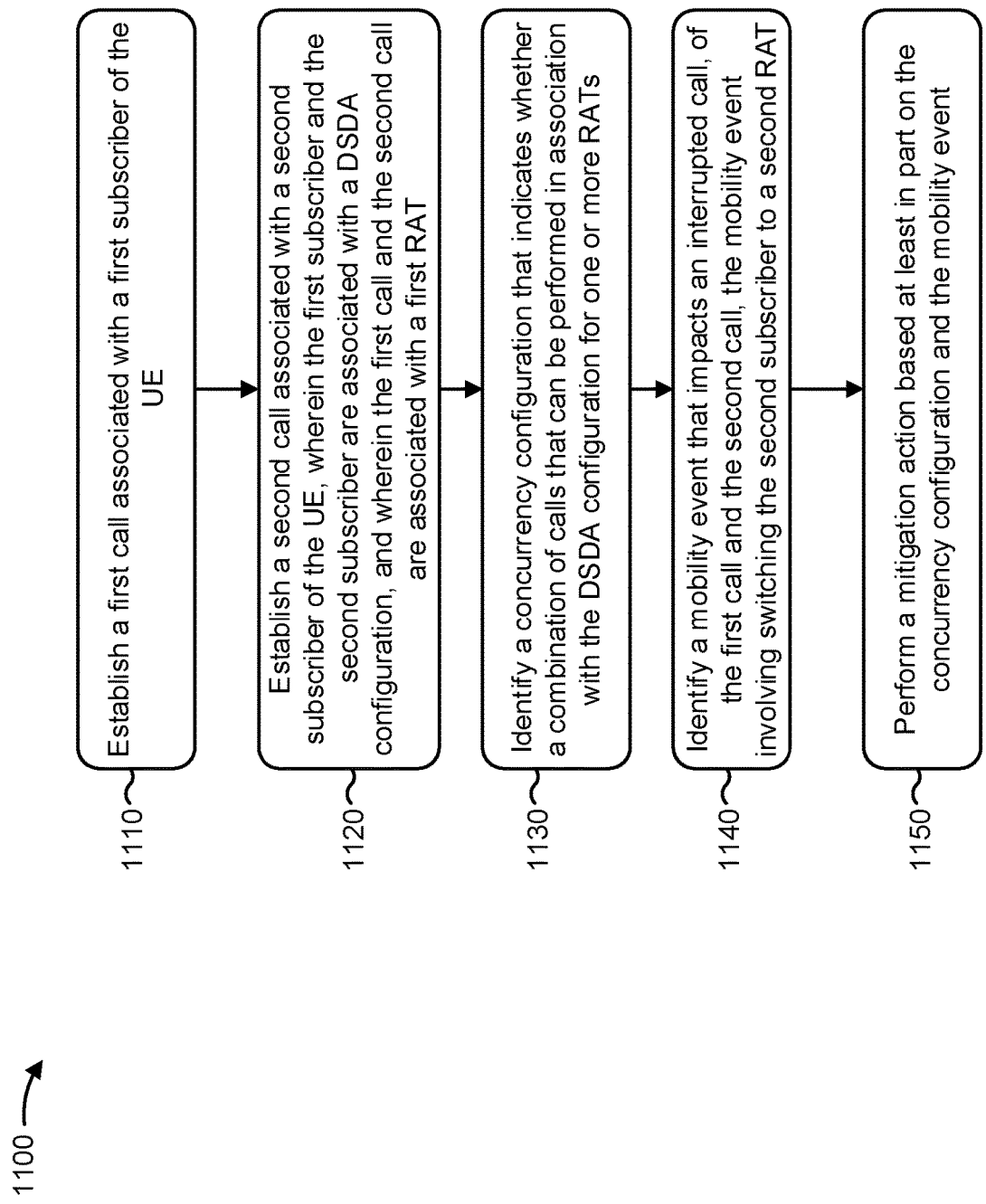
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with mobility for a DSDA UE.

As shown in FIG. 11, in some aspects, process 1100 may include establishing a first call associated with a first subscriber of the UE (block 1110). For example, the UE (e.g., using establishment component 1208, depicted in FIG. 12) may establish a first call associated with a first subscriber of the UE, as described above.

As further shown in FIG. 11, in some aspects, process 1100 may include establishing a second call associated with a second subscriber of the UE, wherein the first subscriber and the second subscriber are active contemporaneously, and wherein the first call and the second call are associated with a first RAT (block 1120). For example, the UE (e.g., using establishment component 1208, depicted in FIG. 1) may establish a second call associated with a second subscriber of the UE, wherein the first subscriber and the second subscriber are active contemporaneously (e.g., associated with a DSDA configuration), and wherein the first call and the second call are associated with a first RAT, as described above.

As further shown in FIG. 11, in some aspects, process 1100 may include identifying a configuration that indicates a combination of calls that can be performed in association with multiple active calls for different subscribers for one or more RATs (block 1130). For example, the UE (e.g., using identification component 1210, depicted in FIG. 12) may identify a configuration that indicates a combination of calls that can be performed in association with multiple active calls for different subscribers for one or more RATs, as described above.

As further shown in FIG. 11, in some aspects, process 1100 may include identifying a mobility event associated with an interruption to at least one of the first call and the second call, the mobility event involving switching the first subscriber to a second RAT (block 1140). For example, the UE (e.g., using mobility component 1212, depicted in FIG. 12) may identify a mobility event associated with an interruption to at least one of the first call and the second call, the mobility event involving switching the first subscriber to a second RAT, as described above.

As further shown in FIG. 11, in some aspects, process 1100 may include performing a mitigation action based at least in part on the configuration and the mobility event (block 1150). For example, the UE (e.g., using establishment component 1208 or mobility component 1212, depicted in FIG. 12) may perform a mitigation action based at least in part on the configuration and the mobility event, as described above.

Process 1100 may include additional aspects, such as any single aspect or any combination of aspects described below and/or in connection with one or more other processes described elsewhere herein.

In a first aspect, the first call is a voice call over the first RAT, and wherein performing the mitigation action comprises entering a dual subscriber dual standby configuration, and suspending the second call until the first call concludes.

In a second aspect, alone or in combination with the first aspect, process 1100 includes continuing the first call on the second RAT.

In a third aspect, alone or in combination with one or more of the first and second aspects, the first call is a voice call and the second call is a data call.

In a fourth aspect, alone or in combination with one or more of the first through third aspects, the first call is a data call on the first RAT, and wherein performing the mitigation action comprises canceling the mobility event, and continuing the first call and the second call on the first RAT.

In a fifth aspect, alone or in combination with one or more of the first through fourth aspects, the first subscriber and the second subscriber are active contemporaneously after the mitigation action is performed.

In a sixth aspect, alone or in combination with one or more of the first through fifth aspects, the first call is a voice call and the mobility event is an Evolved Packet System fallback to the second RAT, and wherein performing the mitigation action comprises entering a dual subscriber dual standby configuration, and suspending the second call until the first call concludes.

In a seventh aspect, alone or in combination with one or more of the first through sixth aspects, process 1100 includes performing the mobility event.

In an eighth aspect, alone or in combination with one or more of the first through seventh aspects, the first call is a mobile-originated or mobile-terminated voice call, and the second call is a voice call, and wherein performing the mitigation action comprises canceling the mobility event, and continuing the second call.

In a ninth aspect, alone or in combination with one or more of the first through eighth aspects, the mobility event is an Evolved Packet System fallback to the second RAT.

In a tenth aspect, alone or in combination with one or more of the first through ninth aspects, the first call is an Enhanced 911 (E911) call and the mobility event is an Evolved Packet System fallback to the second RAT, and wherein performing the mitigation action comprises performing the mobility event, and disabling a protocol entity associated with the second call.

In an eleventh aspect, alone or in combination with one or more of the first through tenth aspects, the first call is a mobile-originated or mobile-terminated voice call and the second call is associated with a gaming service, the mobility event is an Evolved Packet System fallback to the second RAT, and performing the mitigation action comprises canceling the mobility event, and continuing the second call.

In a twelfth aspect, alone or in combination with one or more of the first through eleventh aspects, the first subscriber is associated with a DDS of the UE and the second subscriber is associated with a non-DDS of the UE.

In a thirteenth aspect, alone or in combination with one or more of the first through twelfth aspects, the second subscriber is associated with a DDS of the UE and the first subscriber is associated with a non-DDS of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
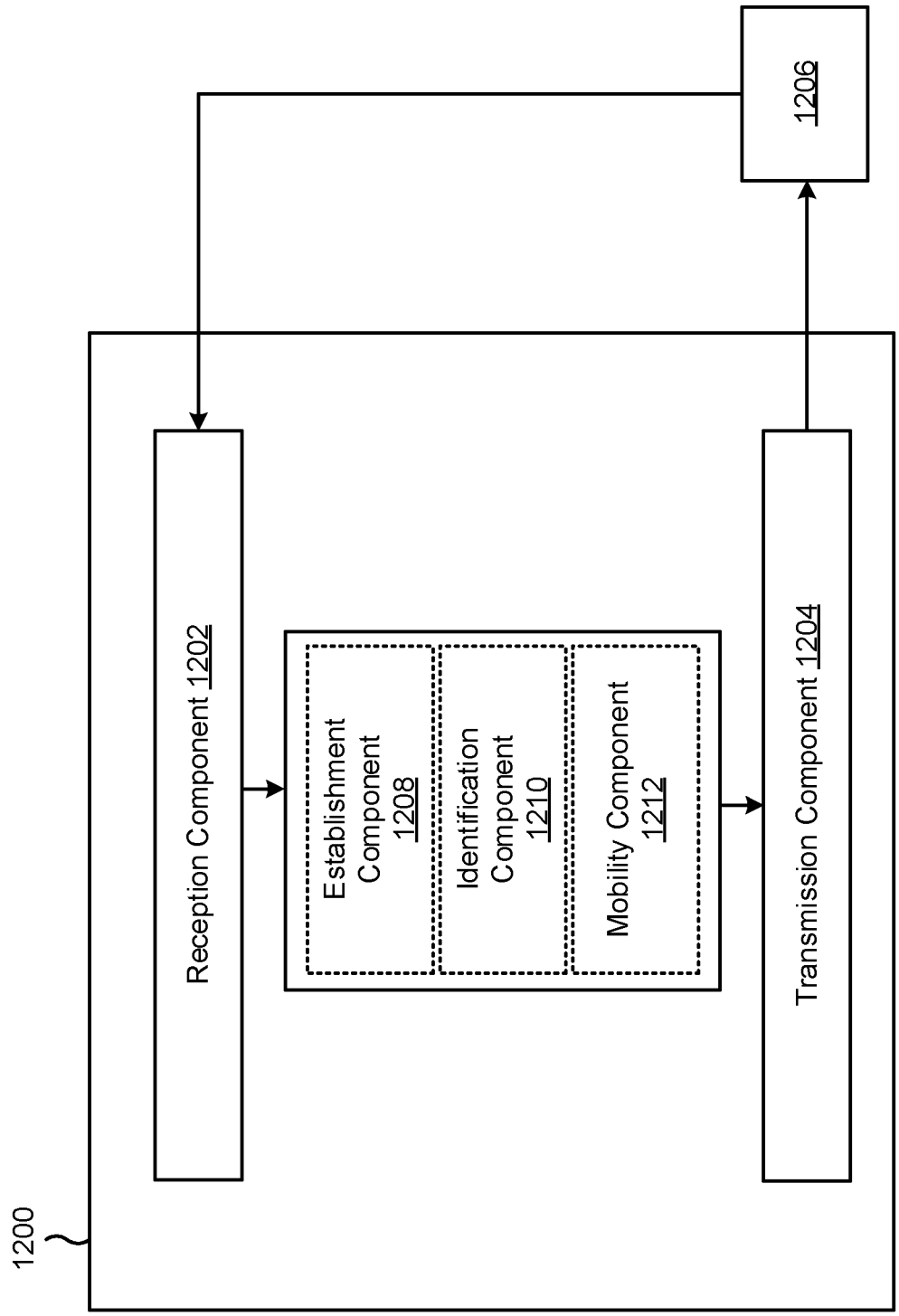
FIG. 12 is a block diagram of an example apparatus for wireless communication, in accordance with the present disclosure.

FIG. 12 is a block diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a establishment component 1208, an identification component 1210, or a mobility component 1212, among other examples.

In some aspects, the apparatus 1200 may be configured to perform one or more operations described herein in connection with FIGS. 3-9. Additionally, or alternatively, the apparatus 1200 may be configured to perform one or more processes described herein, such as process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The establishment component 1208 may establish a first call associated with a first subscriber of the UE. The establishment component 1208 may establish a second call associated with a second subscriber of the UE, wherein the first subscriber and the second subscriber are active contemporaneously, and wherein the first call and the second call are associated with a first RAT. The identification component 1210 may identify a configuration that indicates a combination of calls that can be performed in association with the DSDA configuration for one or more RATs. The mobility component 1212 may identify a mobility event associated with an interruption to at least one of the first call and the second call, the mobility event involving switching the first subscriber to a second RAT. The establishment component 1208 or the mobility component 1212 may perform a mitigation action based at least in part on the configuration and the mobility event. The establishment component 1208 may continue the interrupted call on the second RAT. The mobility component 1212 may perform the mobility event.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: establishing a first call associated with a first subscriber of the UE; establishing a second call associated with a second subscriber of the UE, wherein the first subscriber and the second subscriber are active contemporaneously, and wherein the first call and the second call are associated with a first radio access technology (RAT); identifying a configuration that indicates a combination of calls that can be performed in association with multiple active calls for different subscribers for one or more RATs; identifying a mobility event associated with an interruption to at least one of the first call and the second call, the mobility event involving switching the first subscriber to a second RAT; and performing a mitigation action based at least in part on the configuration and the mobility event.

Aspect 2: The method of Aspect 1, wherein the first call is a voice call over the first RAT, and wherein performing the mitigation action comprises: entering a dual subscriber dual standby configuration; and suspending the second call until the first call concludes.

Aspect 3: The method of Aspect 2, further comprising: continuing the first call on the second RAT.

Aspect 4: The method of Aspect 2, wherein the first call is a voice call and the second call is a data call.

Aspect 5: The method of Aspect 1, wherein the first call is a data call on the first RAT, and wherein performing the mitigation action comprises: cancelling the mobility event; and continuing the first call and the second call on the first RAT.

Aspect 6: The method of Aspect 5, wherein the UE remains in the DSDA configuration after the mitigation action is performed.

Aspect 7: The method of Aspect 1, wherein the first call is a voice call and the mobility event is an Evolved Packet System fallback to the second RAT, and wherein performing the mitigation action comprises: entering a dual subscriber dual standby configuration; and suspending the second call until the first call concludes.

Aspect 8: The method of Aspect 7, further comprising: performing the mobility event.

Aspect 9: The method of Aspect 1, wherein the first call is a mobile-originated or mobile-terminated voice call, and wherein the second call is a voice call, and wherein performing the mitigation action comprises: cancelling the mobility event; and continuing the second call.

Aspect 10: The method of Aspect 9, wherein the mobility event is an Evolved Packet System fallback to the second RAT.

Aspect 11: The method of Aspect 1, wherein the first call is an Enhanced 911 (E911) call and the mobility event is an Evolved Packet System fallback to the second RAT, and wherein performing the mitigation action comprises: performing the mobility event; and disabling a protocol entity associated with the second call.

Aspect 12: The method of Aspect 1, wherein the first call is a mobile-originated or mobile-terminated voice call and the second call is associated with a gaming service, wherein the mobility event is an Evolved Packet System fallback to the second RAT, and wherein performing the mitigation action comprises: cancelling the mobility event; and continuing the second call.

Aspect 13: The method of Aspect 1, wherein the first subscriber is associated with a default data subscriber identity module (DDS) of the UE and the second subscriber is associated with a non-DDS of the UE.

Aspect 14: The method of Aspect 1, wherein the second subscriber is associated with a default data subscriber identity module (DDS) of the UE and the first subscriber is associated with a non-DDS of the UE.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   establishing a first call associated with a first subscriber of the UE;
   establishing a second call associated with a second subscriber of the UE, wherein the first subscriber and the second subscriber are active contemporaneously, and wherein the first call and the second call are associated with a first radio access technology (RAT), wherein the first subscriber is associated with a default data subscriber identity (DDS) module of the UE, and the second subscriber is associated with a non-DDS module of the UE;
   identifying a configuration that indicates a combination of calls that can be performed in association with multiple active calls for different subscribers for one or more RATs;
   identifying a mobility event associated with an interruption to at least one of the first call or the second call, the mobility event involving switching one of the first subscriber or the second subscriber to a second RAT, wherein the mobility event is associated with the DDS module of the UE or the non-DDS module of the UE; and
   performing a mitigation action based at least in part on the configuration and the mobility event.

2. The method of claim 1, wherein the first call is a voice call over the first RAT, and wherein performing the mitigation action comprises:
   entering a dual subscriber dual standby configuration; and
   suspending the second call until the first call concludes.

3. The method of claim 2, further comprising:
   continuing the first call on the second RAT.

4. The method of claim 2, wherein the first call is a voice call and the second call is a data call.

5. The method of claim 1, wherein the first call is a data call on the first RAT, and wherein performing the mitigation action comprises:
   cancelling the mobility event; and
   continuing the first call and the second call on the first RAT.

6. The method of claim 5, wherein the first subscriber and the second subscriber are active contemporaneously after the mitigation action is performed.

7. The method of claim 1, wherein the first call is a voice call and the mobility event is an Evolved Packet System fallback to the second RAT, and wherein performing the mitigation action comprises:
   entering a dual subscriber dual standby configuration; and
   suspending the second call until the first call concludes.

8. The method of claim 7, further comprising:
   performing the mobility event.

9. The method of claim 1, wherein the first call is a mobile-originated or mobile-terminated voice call, and wherein the second call is a voice call, and wherein performing the mitigation action comprises:
   cancelling the mobility event; and
   continuing the second call.

10. The method of claim 9, wherein the mobility event is an Evolved Packet System fallback to the second RAT.

11. The method of claim 1, wherein the first call is an Enhanced 911 (E911) call and the mobility event is an Evolved Packet System fallback to the second RAT, and wherein performing the mitigation action comprises:
    performing the mobility event; and
    disabling a protocol entity associated with the second call.

12. The method of claim 1, wherein the first call is a mobile-originated or mobile-terminated voice call and the second call is associated with a gaming service, wherein the mobility event is an Evolved Packet System fallback to the second RAT, and wherein performing the mitigation action comprises:
    cancelling the mobility event; and
    continuing the second call.

13. An apparatus for wireless communication at a user equipment (UE), comprising:
    a memory; and one or more processors, coupled to the memory, configured to:
    establish a first call associated with a first subscriber of the UE;
    establish a second call associated with a second subscriber of the UE, wherein the first subscriber and the second subscriber are active contemporaneously, and wherein the first call and the second call are associated with a first radio access technology (RAT), wherein the first subscriber is associated with a default data subscriber identity (DDS) module of the UE, and the second subscriber is associated with a non-DDS module of the UE;
    identify a configuration that indicates a combination of calls that can be performed in association with multiple active calls for different subscribers for one or more RATs;
    identify a mobility event associated with an interruption to at least one of the first call or the second call, the mobility event involving switching one of the first subscriber or the second subscriber to a second RAT, wherein the mobility event is associated with the DDS module of the UE or the non-DDS module of the UE; and
    perform a mitigation action based at least in part on the configuration and the mobility event.

14. The apparatus of claim 13, wherein the first call is a voice call over the first RAT, and wherein performing the mitigation action comprises:
    enter a dual subscriber dual standby configuration; and
    suspend the second call until the first call concludes.

15. The apparatus of claim 14, wherein the one or more processors are further configured to:
    continue the first call on the second RAT.

16. The apparatus of claim 14, wherein the first call is a voice call and the second call is a data call.

17. The apparatus of claim 13, wherein the first call is a data call on the first RAT, and wherein performing the mitigation action comprises:
cancel the mobility event; and
continue the first call and the second call on the first RAT.

18. The apparatus of claim 17, wherein the first subscriber and the second subscriber are active contemporaneously after the mitigation action is performed.

19. The apparatus of claim 13, wherein the first call is a voice call and the mobility event is an Evolved Packet System fallback to the second RAT, and wherein performing the mitigation action comprises:
enter a dual subscriber dual standby configuration; and
suspend the second call until the first call concludes.

20. The apparatus of claim 19, wherein the one or more processors are further configured to:
perform the mobility event.

21. The apparatus of claim 13, wherein the first call is a mobile-originated or mobile-terminated voice call, and wherein the second call is a voice call, and wherein performing the mitigation action comprises:
cancel the mobility event; and
continue the second call.

22. The apparatus of claim 21, wherein the mobility event is an Evolved Packet System fallback to the second RAT.

23. The apparatus of claim 13, wherein the first call is an Enhanced 911 (E911) call and the mobility event is an Evolved Packet System fallback to the second RAT, and wherein performing the mitigation action comprises:
perform the mobility event; and
disable a protocol entity associated with the second call.

24. The apparatus of claim 13, wherein the first call is a mobile-originated or mobile-terminated voice call and the second call is associated with a gaming service, wherein the mobility event is an Evolved Packet System fallback to the second RAT, and wherein performing the mitigation action comprises:
cancel the mobility event; and
continue the second call.

25. A non-transitory computer-readable medium storing a set of instructions for wireless communication,
the set of instructions comprising:
one or more instructions that, when executed by one or more processors of a user equipment (UE), cause the UE to:
establish a first call associated with a first subscriber of the UE;
establish a second call associated with a second subscriber of the UE, wherein the first subscriber and the second subscriber are active contemporaneously, and wherein the first call and the second call are associated with a first radio access technology (RAT), wherein the first subscriber is associated with a default data subscriber identity (DDS) module of the UE, and the second subscriber is associated with a non-DDS module of the UE;
identify a configuration that indicates a combination of calls that can be performed in association with multiple active calls for different subscribers for one or more RATs;
identify a mobility event associated with an interruption to at least one of the first call or the second call, the mobility event involving switching one of the first subscriber or the second subscriber to a second RAT, wherein the mobility event is associated with the DDS module of the UE or the non-DDS module of the UE; and
perform a mitigation action based at least in part on the configuration and the mobility event.

26. The non-transitory computer-readable medium of claim 25, wherein the first subscriber and the second subscriber are configured to be active contemporaneously after the mitigation action is performed.

27. An apparatus for wireless communication, comprising:
means for establishing a first call associated with a first subscriber of the apparatus;
means for establishing a second call associated with a second subscriber of the apparatus, wherein the first subscriber and the second subscriber are active contemporaneously, and wherein the first call and the second call are associated with a first radio access technology (RAT), wherein the first subscriber is associated with a data subscriber identity (DDS) module of the UE and the second subscriber is associated with a non-DDS module of the UE;
means for identifying a configuration that indicates a combination of calls that can be performed in association with multiple active calls for different subscribers for one or more RATs;
means for identifying a mobility event associated with an interruption to at least one of the first call and the second call, the mobility event involving switching one of the first subscriber or the second subscriber to a second RAT, wherein the mobility event is associated with the DDS module of the apparatus or the non-DDS module of the apparatus; and
means for performing a mitigation action based at least in part on the configuration and the mobility event.

28. The apparatus of claim 27, wherein the first subscriber and the second subscriber are configured to be active contemporaneously after the mitigation action is performed.

29. The non-transitory computer-readable medium of claim 25, wherein the first call is a voice call over the first RAT, and wherein the instructions to perform the mitigation action are further configured to cause the UE to:
enter a dual subscriber dual standby configuration; and
suspend the second call until the first call concludes.

30. The non-transitory computer-readable medium of claim 25, wherein the first call is a voice call over the first RAT, and wherein the instructions to perform the mitigation action are further configured to cause the UE to:
cancel the mobility event; and
continue the first call and the second call on the first RAT.

31. The apparatus of claim 27, wherein the first call is a voice call over the first RAT, and wherein the means for performing the mitigation action comprise:
means for entering a dual subscriber dual standby configuration; and
means for suspending the second call until the first call concludes.

32. The apparatus of claim 27, wherein the first call is a data call on the first RAT, and wherein the means for performing the mitigation action comprise:
means for canceling the mobility event; and
means for continuing the first call and the second call on the first RAT.

* * * * *